United States Patent [19]

Hanson

[11] Patent Number: 4,856,350
[45] Date of Patent: Aug. 15, 1989

[54] FORCE SENSING DEVICE AND METHOD

[76] Inventor: Richard A. Hanson, 21220 N.E. 156th St., Woodinville, Wash. 98072

[21] Appl. No.: 112,409

[22] Filed: Oct. 22, 1987

[51] Int. Cl.$^4$ .............................................. G01L 1/10
[52] U.S. Cl. ........................... 73/862.59; 73/DIG. 1
[58] Field of Search ............. 73/862.59, 517 AV, 704, 73/778, DIG. 1, DIG. 4

[56] References Cited

U.S. PATENT DOCUMENTS

| | | |
|---|---|---|
| 3,470,400 | 9/1969 | Weisbord . |
| 3,541,849 | 11/1970 | Corbett . |
| 4,215,570 | 8/1980 | EerNisse ............................ 73/141 R |
| 4,299,122 | 11/1981 | Ueda et al. ...................... 73/862.59 |
| 4,321,500 | 3/1982 | Paros et al. ........................... 310/321 |
| 4,372,173 | 2/1983 | EerNisse et al. ................. 73/862.59 |
| 4,524,619 | 6/1985 | Staudte .................................. 73/505 |
| 4,538,461 | 9/1985 | Juptner et al. ........................ 73/505 |
| 4,654,663 | 3/1987 | Alsenz et al. ..................... 340/870.3 |
| 4,751,849 | 6/1988 | Paros et al. ....................... 73/862.59 |

FOREIGN PATENT DOCUMENTS

| | | |
|---|---|---|
| 0574637 | 9/1977 | U.S.S.R. .......................... 73/DIG. 1 |
| 0974151 | 11/1982 | U.S.S.R. ............................ 73/862.59 |

Primary Examiner—Charles A. Ruehl
Attorney, Agent, or Firm—Flehr, Hohbach, Test, Albritton & Herbert

[57] ABSTRACT

A force sensing device especially suitable for use in an accelerometer or a pressure transducer, depending upon its particular design. This device includes at least one and preferably two adjacent and parallel, elongated vibratable tines and means for vibrating the tines back and forth in a direction normal to their axes of elongation. These tines are supported for vibration by an arrangement including an array of interconnected links and mounting means adapted to be connected to an external member capable of applying a variable external force to the support arrangement along an axis normal to the axes of elongation of the tines. The support arrangement is configured so as to apply to the tines its own internal force in response to and varying with the external force in a way which causes the tines to vibrate at a frequency that varies with the magnitude of the internal force and therefore the external force. In this way, the vibrating frequency of either or both tines can be sensed for determining therefrom the magnitude of the external force applied to the support arrangement.

25 Claims, 4 Drawing Sheets

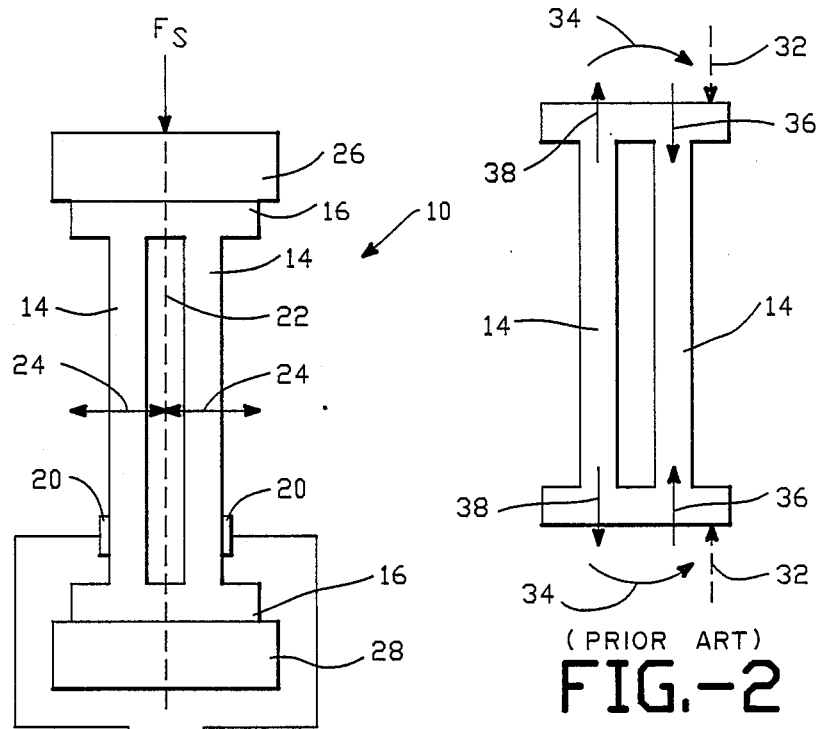
FIG.-1 (PRIOR ART)
FIG.-2 (PRIOR ART)
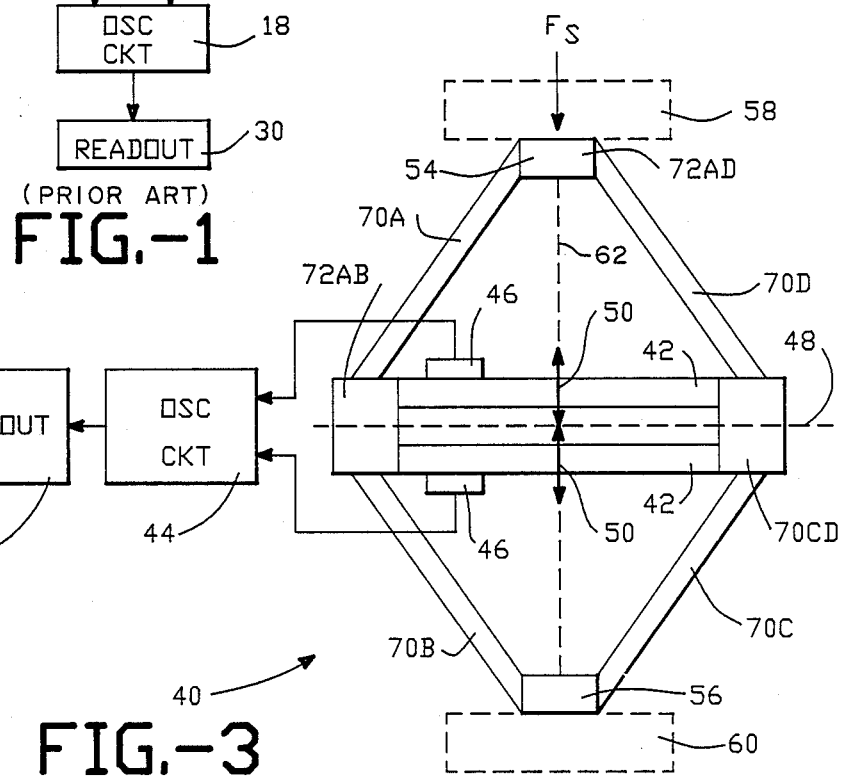
FIG.-3

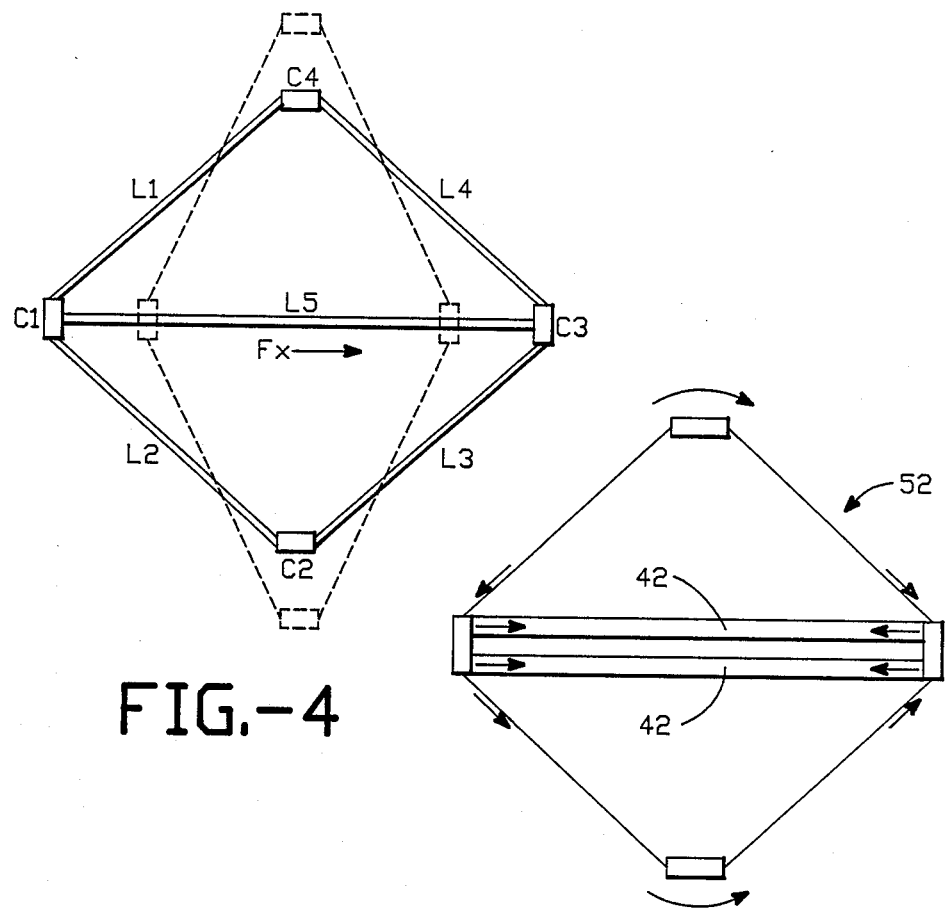
FIG.-4
FIG.-5
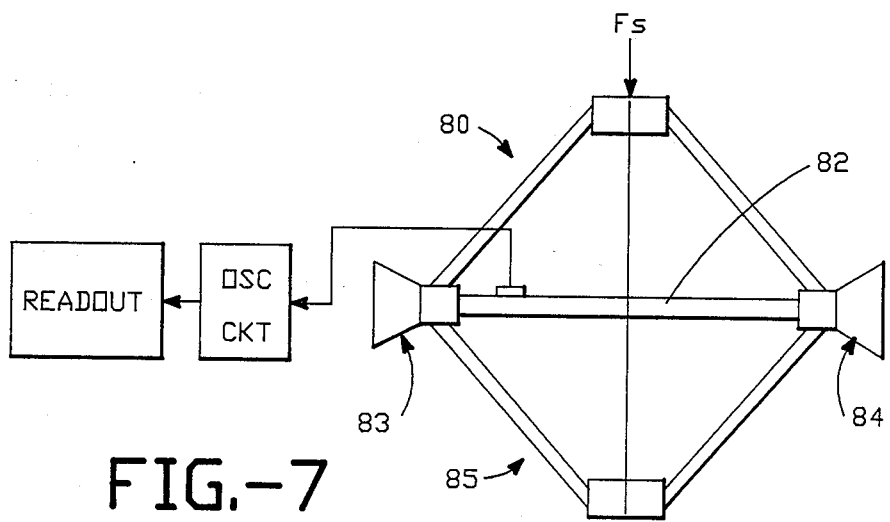
FIG.-7

FORCE SENSING DEVICE AND METHOD

The present invention relates generally to accelerometers, pressure transducers and other such force sensing devices, and more particularly to a specifically designed vibrating crystal type of force sensing device.

The utilization of vibrating crystals in force sensing devices such as accelerometers, pressure transducers, and the like is well-known in the art. Such prior art devices may be found in, for example, EerNisse U.S. Pat. Nos. 4,215,570 and 4,372,173 to name just a few. The essential principles underlying this typical prior art device are illustrated in FIGS. 1 and 2 which will be discussed immediately below.

Referring specifically to FIG. 1, there is illustrated a crystal force transducer 10 which includes a pair of adjacent, parallel, elongated vibratable tines 14 extending between opposing mounting ends 16. The tines and mounting ends may be integrally formed as a single unit from quartz crystal material, as is well-known in the art. A suitable electrical circuit, for example oscillator circuit 18, in combination with electrodes 20 are used to vibrate the tines back and forth in a direction normal to their center axis of elongation 22, as indicated by two-headed arrows 24. For reasons to be discussed below, two tines are vibrated at the same frequency and 180° out of phase with one another. Still referring to FIG. 1, ends 16 serve not only as a means for supporting the tines 14 in the parallel relationship illustrated but also as a mounting means for connecting the tines to the outside world, specifically an external member diagrammatically represented at 26 and 28. External member 26, 28 may be an accelerometer proof mass or pressure sensing bellows or diaphragm, or any other means that applies a variable external force Fs, e.g. the force to be sensed, through the tines along an axis coinciding with tine axis 22. While the force Fs being sensed is shown placing the tine in compression, it could act on the tines in the opposite direction to place them in tension. In either case, the application of external force Fs to the tines will cause the latter to vibrate at a frequency that varies with the magnitude of Fs. Therefore, it is merely a matter of sensing the vibrating frequency of the tines and calibrating the frequency to read out the magnitude of the force Fs. Suitable read out means 30 may be readily provided to that end.

The various components making up the diagrammatically illustrated force transducer 10 including oscillator circuit 18 and read out 30 are well-known in the art and will not be discussed in more detail. To this end, reference is made to the prior art generally and to the above-recited EerNisse patents in particular. It suffices to say here that two parallel tines are used and vibrated in the manner described or at least an attempt is made to vibrate them in the manner described, i.e., at the same frequency and 180° out of phase so that the forces imparted to mounting ends 16 by the vibrating tines tend to balance and cancel one another. If this is successfully achieved, the cancellation of vibration forces at ends 16 is effective, which is a desired objective to achieve. However, there are a number of drawbacks to the transducer design diagrammatically illustrated in FIG. 1, as will be discussed below.

One drawback with the transducer of FIG. 1 is that it is difficult to maintain the vibrating condition of tines 14 such that they reliably remain 180° out of phase with one another. Two primary reasons for this are as follows: manufacturing imperfections resulting in variations in unloaded resonant frequency between the tines and loading between tines may not be symmetrical.

Another drawback associated with the transducer design illustrated in FIG. 1 is diagrammatically shown in FIG. 2. In theory, in order for tines 14 to respond to external Fs in the desired manner, they should be equally supported in their no load (no force Fs) condition. If one of the tines is placed in greater load compression or tension than the other, the output reading of the overall transducer will be adversely affected. Thus, theoretically, the two tines should be supported between member 26, 27 so that the load forces applied by the member are uniformly distributed between the two tines. In reality, it is quite possible for the load forces to be imbalanced, as indicated by arrows 32 in FIG. 2. This places a twisting force on the crystal transducer, as diagrammatically illustrated by arrows 34. This, in turn, places one of the tines, for example, the right-hand tine illustrated in FIG. 2 in compression, as indicated by arrows 36, while the other tine is placed in tension, as indicated by arrows 38, thus adversely affecting the transducer's output.

Still another drawback inherent in the design of transducer 10 resides in the specific orientation of tines 14 with respect to sensing force Fs. Specifically, because the sensing force is coincident with the tines common axis 22, as illustrated in FIG. 1, there is a 1:1 relationship between the external force and the arrangement of tines. Stated another way, for a given external force Fs, one-half of that force is applied to one of the tines and one-half of the force is applied to the other tine. The design does not allow for either amplification of the external signal or for deamplification of the signal, each of which may be advantageous depending upon the intended use of the transducer, as will be discussed hereinafter.

In view of the foregoing, it is one object of the present invention to provide a vibratory type of force sensing device of the general type described above but designed to eliminate the previously discussed drawbacks associated with the prior art design.

Another, more particular object of the present invention is to provide a vibratory type of force sensing device which includes dual vibrating tines and a specifically designed arrangement for supporting the tines such that the latter are reliably balanced in their motion.

Another particular object of the present invention is to provide a vibratory type of force sensing device of the last-mentioned type in which its support arrangement is specifically designed to reduce sensitivity caused by a twist of the type described above in conjunction with FIG. 2.

Still another particular object of the present invention is to provide a vibratory type of force sensing device of the last-mentioned type in which the support arrangement is configured such that the external force being sensed can be either enlarged (amplified) or decreased (deamplified) in magnitude as it is applied to the vibrating tines, whereby the device can be custom designed for its intended use as, for example, an accelerometer by amplifying the external sensing force or, for example, a high pressure transducer by deamplifying the external force.

A further object of the present invention is to provide a vibratory type of force sensing device of the last mentioned type or one utilizing a single tine in which under certain circumstances the crystal transducer can be provided with enhanced sensitive axis compliance and thereby made structurally more reliable.

The foregoing objects and other objects and features of the present invention will become more apparent from the detailed description to follow in conjunction with the drawings wherein:

FIG. 1 is a diagrammatic illustration, partially in plan view, of a vibratory type of force sensing device typical in the prior art;

FIG. 2 is a diagrammatic illustration of a part of the device of FIG. 1, specifically illustrating certain operational aspects of the device;

FIG. 3 is a diagrammatic illustration, partially in plan view, of a vibratory type of force sensing device designed in accordance with the present invention;

Figure 6:
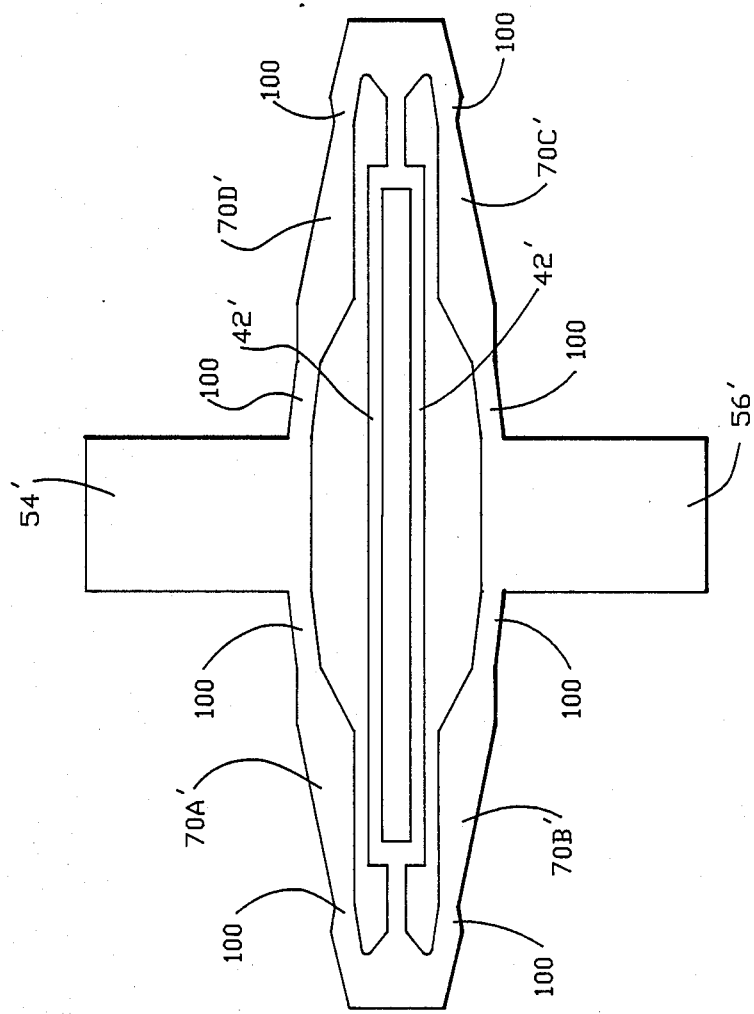

FIG. 4 diagrammatically illustrates an operational feature of the device of FIG. 3;

FIG. 5 diagrammatically illustrates another operational feature of the device of FIG. 3;

FIG. 6 diagrammatically illustrates a pair of vibrating tines and associated support arrangement for use as a preferred embodiment of an acceleration transducer as it would appear if integrally formed as a single unit from quartz crystal material, which integral unit forms part of overall device of the type illustrated in FIG. 3; and FIG. 7 is a diagrammatic illustration, partially in plan view, of a vibratory force sensing device designed in accordance with a second embodiment of the present invention.

Figure 8:
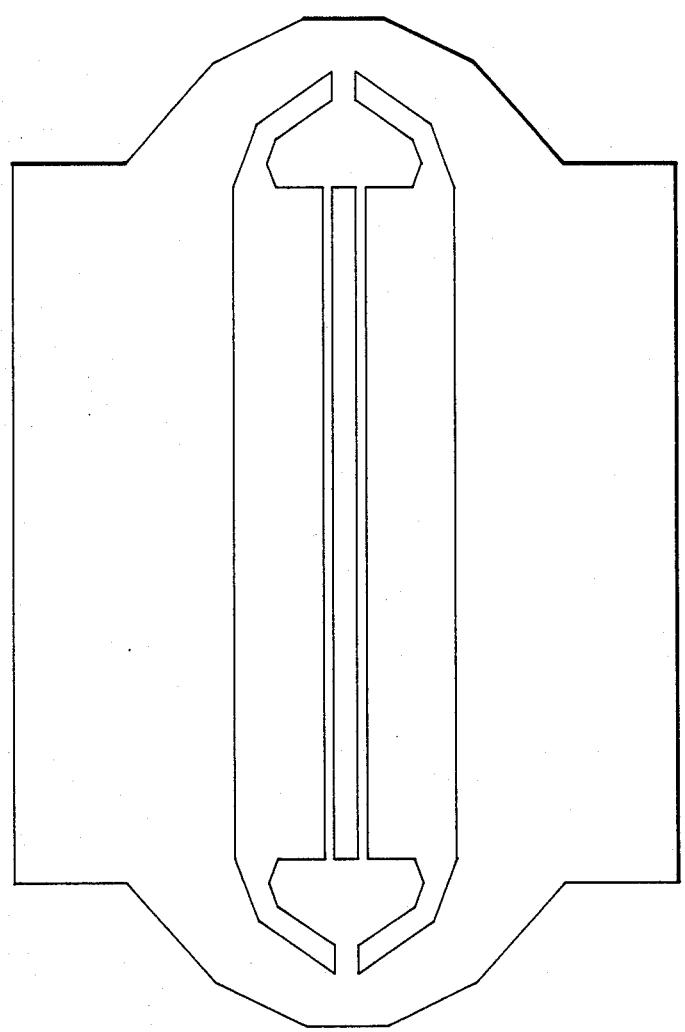

FIG. 8 diagrammatically illustrates a pair of vibrating tines and associated support arrangement for use as a preferred embodiment of a pressure transducer as it would appear if integrally formed as a single unit from quartz crystal material, which integral unit forms part of overall device of the type illustrated in FIG. 3.

Having discussed FIGS. 1 and 2 previously, attention is immediately directed to FIG. 3 which, as indicated above, diagrammatically illustrates a vibratory force sensing device designed in accordance with the present invention. This device, which is generally indicated by the reference numeral 40, includes a pair of parallel, adjacent elongated vibratable tines which, for purposes of description, are assumed to extend in the plane of the paper. The device also includes a suitable oscillator circuit 44 connected to the tines through suitable electrodes 46 for vibrating the tines back and forth in the plane of the paper and in a direction normal to their common center axis 48, as indicated by the two-way arrows 50. Circuit 44 is specifically designed to vibrate tines 42 at the same predetermined frequency, out of phase with one another by 180°, under no load conditions, that is, conditions in which the overall device is not subjected to any external sensing forces Fs other than possibly a no load null force and, ideally, also under load conditions.

The vibrating tines just described are supported for vibration by means of a support arrangement which is designed in accordance with the present invention and which is generally designated by the reference numeral 52. While the support arrangement will be described in more detail hereinafter, for the moment it suffices to say that the arrangement includes mounting means 54 and 56 which lie in a common plane (in the paper) and which are placed against, physically connected to or otherwise coupled with an external member diagrammatically represented by dotted lines at 58 and 60. Like previously described member 26, 28 (see FIG. 1), member 58, 60 is capable of responding to a variable external force Fs (the force to be sensed) to support arrangement 52, but does so along an axis 62 normal to the elongation axes of the tines 42 and therefore normal to common tine axis 48, rather than parallel as in the case of transducer 10. In fact, in the particular embodiment illustrated in FIG. 3, axis 62 actually bisects the two tines 42. The member 58, 60 may be, for example, an accelerometer proof mass or pressure sensing bellows or diaphragm or other such arrangement.

As will be described in more detail hereinafter, support arrangement 52 is specifically configured so as to apply to each of the tines 42 its own internal force in response to and varying proportionately with external force Fs. These internal forces will place the tines in further tension if applied to support arrangement 52 in the manner illustrated or in further compression if applied in the opposite direction. In either case, the presence of these internal forces will cause the tines to vibrate at a frequency that varies with the magnitude of these internal forces and therefore the magnitude of external sensed force Fs. Thus, overall device 40 is provided with a read out circuit 64 connected to the output of oscillator circuit 44 for sensing the vibrating frequency of one or both tines and for determining therefrom the magnitude of the external force Fs at any given time during operation of device 40.

Before proceeding with a detailed description of support arrangement 52 which forms the basis of the present invention, it is important to make certain comments relating to the device as described thus far. First, it is to be understood that the tines per se, for the purpose intended, can be readily provided by one with ordinary skill in the art along with oscillating circuit 44, its associated electrodes 46 and read out circuit 64. Specifically, the present invention does not reside in the specific selection of tines 42, either in the material utilized or their size and shape, and it does not reside in the particular way in which the tines are made to vibrate under no load conditions or the specific circuitry for accomplishing this. Rather, the present invention resides in the particular way in which the tines are supported with respect to the force Fs being sensed and in the particular way in which the support arrangement responds to the external forces being sensed to impart internal forces to the vibrating tines in order to cause the tines to vibrate at a frequency that varies with these internal forces.

Still referring to FIG. 3, attention is now directed to the structural details of support arrangement 52. As shown there, this arrangement includes four substantially rigid, identical elongated links 70A, 70B, 70C and 70D, and connecting means 72AB, 72BC, 72CD and 72AD interconnecting the links to one another and to opposite sides of the tines 42 so as to substantially form a parallelogram. As seen in FIG. 3, the elongation axes of the tines 42, actually their common center axis 48, extends between opposing connecting means 72AB and 72CD and the force sensing axis 62 along which external force Fs is applied extends between opposing connecting means 72BC and 72AD, both of which also serve as the previously recited mounting means 56. The four links and connecting means are suitably selected and may be readily provided so as to form a five bar linkage assembly as illustrated in and to be described below in conjunction with FIG. 4.

Referring to FIG. 4, the five bar linkage formed by structural arrangement 52 and tines 42 is diagrammatically illustrated with the two tines 42 being shown as a single cross link. For purposes of description, the five links shown in FIG. 4 will be designated L1, L2, L3, L4 and L5 and the corners will be designated C1, C2, C3, C4. As is well-known, in a five bar linkage assembly, if a force, for example Fs, is applied downward at the top corner C4, as shown, the force Fx in cross link L5 is a function of force Fs in accordance with the following equation:

$$Fx = Fs/\tan \theta$$

As shown in FIG. 4, $\theta$ is one-half the angle defined by corner C1 or C3, that is, that angle subtended by L1 and L5; L2 and L5; L3 and L5; or L4 and L5. It is important to note the particular relationship between external force Fs, internal force Fx and angle $\theta$. More specifically, when $\theta$ is equal to 45°, there is a 1:1 relationship between Fs and Fx. However, for angles less than 45°, Fx is greater than Fs (i.e., amplified) and for angles greater than 45°, Fx is less than Fs (i.e., deamplified). Thus, in providing the internal force Fx through its cross link L5, the five bar linkage assembly can be configure either to serve as a means of amplifying the externally applied signal Fs or deamplifying it. This is an important feature of support arrangement 52, as will be discussed immediately below.

As indicated previously, force sensing device 40 may be specifically designed for use as, for example, an accelerometer or it may be specifically designed for use as, for example, a pressure transducer. In the former case, the full scale sensing forces are typically small, for example on the order of 0.02 lb. In the latter case, the sensing forces would be comparatively large, for example on the order of 0.40 lb. Thus, if the device is designed for use as an accelerometer, its five bar linkage should be configured to include a relatively small angle $\theta$. Of course, because device 10 includes two identical parallel tines taking up the cross force, each tine would be subjected to one-half of the amplified internal force. Nevertheless, each tine would be subjected to a force substantially greater than the externally applied force and therefore would provide a more sensitive output. Another advantage in providing an amplified cross force Fx is that the larger force places a greater strain on the tines than would be the case if the cross force were equal to the externally applied force. As a result, the overall structure deflects through a greater distance than would otherwise be the case and therefore overload caging is easier and there is greater structural integrity. In the case of the deamplification of the applied force, a more rigid (less compliant) crystal will provide better restraint, for example for a pressure sensing diaphragm, to reduce hysteretic strain in such a sensing element.

It should be apparent from FIGS. 1 and 2 that the typical prior art arrangement diagrammatically illustrated there does not have either of the advantages discussed immediately above, that is, either enhanced sensitivity or structural integrity because the forces actually applied to the tines cannot be greater than the external force Fs applied thereto. In fact, the force applied to each tine is at most approximately one-half of the external force. Obviously, this does not enhance the sensitivity of the overall device and it certainly does not enhance the structural integrity of the tines.

The discussions immediately above related to the use of device 10 as an accelerometer or other such means taking advantage of the amplification capability of support structure 52. In the case of the pressure transducer, for example, by making the angle $\theta$ large, the internal force applied to each tine 42 can be reduced substantially as compared to the external force Fs. In this type of arrangement, induced compliance is not as critical as in the case of an accelerometer because the forces in question are relatively large and the tines themselves can be initially made with more structural integrity while maintaining the desired sensitivity. In the case of an accelerometer where the anticipated external forces are quite small, to preserve the desired sensitivity, the linkage must be initially made much more compliant.

Another advantage in the five bar linkage configuration of support arrangement 52 resides in its ability to more reliably maintain the out of phase frequency mode of tines 42 during operation of the overall device. As indicated previously, from the standpoint of it is important to balance the tines 42 forces as much as possible. This is accomplished by making the tines as identical as possible, and exciting them with the oscillator to vibrate as close to 180° out of phase as possible. The support arrangement 52 does more to accomplish this than the arrangement illustrated in FIGS. 1 and 2. One reason for this is associated with added compliance which separates the natural frequencies of the in phase and out of phase, in plane modes.

Still another advantage to applicant's specifically configured support arrangement is illustrated diagrammatically in FIG. 5. As seen there, the support arrangement is being subjected to the same end twist shown in FIG. 2, as represented by arrows 34. In the case of device 10, the end twist placed one of the tines in compression while the other tine was placed in tension, thereby making it difficult to vibrate the two tines at the same frequency and thereby adversely affecting the ability to vibrate tines 14 out of phase. On the other hand, as illustrated in FIG. 5, the very same end twisting on support arrangement 52 places both of the tines in substantially the same amount of compression. Hence, both tines are placed in compression and since they are placed in approximately the same amount of compression, these loads due to end twisting can be readily nulled out by means of circuit 44 and read out 64 or computerized calibration or modeling. Thus, the effects of end twisting can be readily compensated for in device 40.

Turning now to FIG. 6, a five bar linkage assembly 76 serving as a combination support arrangement 52/tines 42 is shown. The tines, links and interconnecting means making up this five bar linkage are illustrated as they would appear integrally formed as a contemplated, preferred working embodiment of a single unit of quartz crystal material serving as an acceleration transducer. This unit is drawn in proportion throughout and therefore all of its dimensions can be determined by the dimensions shown. The mounting pads are shown at 54' and 56' and the links at 70'A-70'D. The tines are shown at 42'. The overall thickness of the unit is 0.006 inch. FIG. 8 illustrates a similar assembly as it would appear integrally formed from quartz crystal material as a preferred working embodiment serving as a pressure transducer.

Having described overall dual tine device 40 and its various advantages, attention is directed to FIG. 7. This figure illustrates a device 80 which may be substantially identical to device 40 in all respects, except two. First, device 80 includes a single cross tine 82 in place of dual tines 42. Second, in the case of device 40, the tines and links are placed in a common plane, specifically the plane of the paper, and the tines are vibrated back and forth in the same common plane. In the case of device 80, the links and tine lie in the plane of the paper but applicant has found that the single tine 82 ca also be vibrated back and forth in a plane through the tine and normal to the common plane of the paper.

Device 80 includes many of the advantages attributed to device 40. Specifically, it can provide the same amplification or deamplification between its externally applied sensing force Fs and the internal force applied to its tine. Also it can be made substantially insensitive to end twisting. However, like any single tine device, its vibration forces are not balanced.

It does allow for balance via counterweights 83 and 84 action and via the compliance of the arms 85 which reduce the strain in the attachment pads for a given tine vibratory amplitude.

What is claimed is:

1. A force sensing device, comprising:
   (a) at least one elongated, vibratable tine;
   (b) means for vibrating said tine back and forth in a direction normal to its axis of elongation;
   (c) an arrangement supporting said tine for said vibration and including mounting means adapted for connection to an external member capable of applying a variable external force to the support arrangement along an axis not parallel to the axis of elongation of said tine, said support arrangement being configured so as to apply to said tine its own internal force in response to and varying with said external force in a way which causes the tine to vibrate at a frequency that varies with the magnitude of said internal force and therefore said external force, said support arrangement including four links of substantially equal lengths and means interconnecting the links to one another and to opposite ends of said tine so as to form a parallelogram such that the elongation axis of the tine extends between a first pair of opposing corners of the parallelogram and such that the direction along which the external force is applied extends between a second pair of opposing corners of the parallelogram and normal to the elongation axis of said tine; and
   (d) means for sensing the vibrating frequency of said tine and for determining therefrom the magnitude of said external force.

2. A device according to claim 1 including a second substantially identical vibratable tine supported by said arrangement for vibration adjacent to and parallel with said first-mentioned tine and vibrated by said vibrating means such that its vibration frequency varies with the magnitude of said external force.

3. A device according to claim 2 wherein said vibrating means vibrates said tines at the same frequency but 180° out of phase with one another in a direction normal to the elongation axes of said tines and parallel with the axis along which said external force is applied.

4. A device according to claim 1 including only said one tine and wherein its direction of vibration is parallel to the axis along which said external force is applied.

5. A device according to claim 1 wherein the corners of said parallelogram containing the ends of said tine are each less than 90° such that said internal force is greater than its associated external force, whereby to make the device especially suitable for measuring small external forces such as acceleration forces.

6. A device according to claim 1 wherein the corners of said parallelogram containing the ends of said tine are each greater than 90° such that said internal force is less than its associated external force, whereby to make the device especially suitable for measuring large forces such as large pressures.

7. A device according to claim 1 wherein said tine, said links and said interconnecting means are integrally formed as of a single unit of quartz crystal material.

8. A device according to claim 1 wherein said support arrangement is configured such that said internal force is greater than said external force.

9. A force sensing device, comprising:
   (a) at least one elongated, vibratable tine;
   (b) means for vibrating said tine in a particular way;
   (c) an arrangement including a plurality of links interconnected to one another and to said tine for supporting the latter for said vibration and further including means adapted for connection to an external member capable of applying a variable external force to the support arrangement which is configured so as to apply to the tine its own internal force in response to and varying with said external force in a way which causes the tine to vibrate at a frequency that varies with the magnitude of said internal force and therefore said external force, said support arrangement being configured such that the said external force is applied thereto along an axis which is normal to the axis of elongation of said tine and which bisects the tine, said support arrangement including four links of equal lengths and means interconnecting the links to one another and to opposite ends of said tine so as to form a parallelogram such that the elongation axis of the tine extends between a first pair of opposing corners of the parallelogram and such that said external force is applied to the arrangement along an axis extending between a second pair of opposing corners of the parallelogram; and
   (d) means for sensing the vibrating frequency of said tine and for determining therefrom the magnitude of said external force.

10. A device according to claim 9 wherein said tine, said links and said interconnecting means are integrally formed of a single unit of quartz crystal material.

11. A device according to claim 9 including a second substantially identical vibratable tine supported by said arrangement of links for vibration adjacent to and parallel with said first-mentioned tine and vibrated by said vibrating means such that its vibration frequency varies with the magnitude of said external force.

12. A force sensing device, comprising:
    (a) a pair of substantially identical, adjacent and parallel elongated vibratable tines;
    (b) means for vibrating said tines back and forth at the same frequency but 180° out of phase with one another in a common plane and in a direction normal to the elongation axis of the tines;
    (c) an arrangement including four substantially identical links located in said common plane and means interconnecting the links to one another and to opposite ends of said tines so as to form a parallelogram such that the elongation axes of said tines extend between a first pair of opposing corners of the parallelogram, said arrangement including mounting means located at a second pair of opposing corners of said parallelogram for connecting the arrangement to an external member capable of applying a variable external force to the support arrangement along an axis extending through the second pair of corners of said parallelogram such that the arrangement applies to said tines its own internal force in response to and varying with said external force and causes the tines to vibrate at a frequency that varies with the magnitude of said internal force and therefore said external force; and (d) means for sensing the vibrating frequency of at least one of said tines and for determining therefrom the magnitude of said external force.

13. A device according to claim 12 wherein said tines, said links and said interconnecting means are integrally formed as a single unit of quartz crystal material.

14. A device according to claim 12 wherein the corners of said parallelogram containing the ends of said tine are each less than 90°, whereby to make the device especially suitable for measuring small external forces such as acceleration forces.

15. A device according to claim 12 wherein said corners of said parallelogram containing the ends of said tines are greater than 90°, whereby to make the device especially suitable for measuring large forces such as large pressures.

16. A force sensing device, comprising:
(a) elongated vibratable tine means;
(b) means for vibrating said tine means back and forth in a direction normal to the elongation axis of the tine;
(c) an arrangement including four links and means interconnecting the links to one another and to opposite ends of said tine means so as to form a quadrangle such that the axis of elongation of said tine means extends between a first pair of opposing corners of the quadrangle, said arrangement including mounting means located at a second pair of opposing corners of said quadrangle for connecting the arrangement to an external member capable of applying a variable external force to the arrangement along an axis extending through the second pair of corners of said quadrangle such that the arrangement applies to said tine means its own internal force in response to and varying with said external force and causes the tine means to vibrate at a frequency that varies with the magnitude of said internal force therefore said external force; and
(d) means for sensing the vibrating frequency of said tine means for determining therefrom the magnitude of said external force.

17. A device according to claim 16 wherein said arrangement is configured such that said links and interconnecting means together form a parallelogram.

18. A device according to claim 17 wherein said arrangement is configured such that the said external force is applied thereto along an axis which is normal to the axis of elongation of said tine means.

19. A device according to claim 18 wherein said four links are of equal lengths, whereby the axis along which said external force is applied to said arrangement bisects said tine means.

20. A device according to claim 16 wherein said tine means consists of a single elongated vibratable tine.

21. A device according to claim 16 wherein said tine means includes a pair of substantially identical, adjacent and parallel elongated vibratable tines.

22. A force sensing device, comprising:
(a) elongated vibratable tine means;
(b) means for vibrating said tine means back and forth in a direction normal to the elongation axis of the tine;
(c) an arrangement including a number of structure links and means interconnecting the links to one another to formed a closed loop structure and to opposite ends of said tine means such that the elongation axis of said tine means extends between a first pair of opposing corners of the structure, said arrangement including mounting means located along said structure for connecting the arrangement to an external member capsule of applying a variable external force to the arrangement along an axis which is neither parallel with nor normal to any of the links of said structure such that the arrangement applies to said tine means its own internal force in response to and varying with said external force and causes the tine means to vibrate at a frequency that varies with the magnitude of said internal force and therefore said external force; and
(d) means for sensing the frequency of said tine means and for determining therefrom the magnitude of said external force.

23. A device according to claim 22 wherein said arrangement is configured such that said closed loop structure includes four links interconnected to form a parallelogram.

24. A device according to claim 23 wherein said four links are of equal lengths.

25. A device according to claim 22 wherein said mounting means are located at a second pair of opposing corners of the structure.

* * * * *